United States Patent
Toyoda

[11] 4,007,415
[45] Feb. 8, 1977

[54] CONSTANT VOLTAGE GENERATING CIRCUIT

[75] Inventor: Kenji Toyoda, Kawasaki, Japan

[73] Assignee: Nippon Kogaku K.K., Tokyo, Japan

[22] Filed: Dec. 19, 1975

[21] Appl. No.: 642,532

[30] Foreign Application Priority Data
Dec. 26, 1974 Japan .......................... 49-148387

[52] U.S. Cl. .................................. 323/19; 323/39; 354/51; 354/60 R
[51] Int. Cl.² ......................................... G05F 1/46
[58] Field of Search ............... 73/362 SC; 307/310; 323/1, 8, 16, 19, 21, 39, 65, 66, 68, 74, 81, 94 R; 324/71 SN; 354/50, 51, 60 R

[56] References Cited
UNITED STATES PATENTS 3,851,241  11/1974  Wheatley .............................. 323/8
3,959,717  5/1976   Pitel ................................ 323/69 X Primary Examiner—A. D. Pellinen
Attorney, Agent, or Firm—Shapiro and Shapiro

[57] ABSTRACT

A constant voltage generating circuit comprises a pair of first and second input terminals to which power source voltage is applied over the two terminals, an operational amplifier having output terminals supplying the constant output of the constant voltage generating circuit and two input terminals, a first resistor connected between the first input and one input of the amplifier, a second resistor connected between the first input terminal and the other input terminal of the amplifier, and a pair of logarithmic conversion diodes generating voltage which is logarithmically proportional to current flowing in itself. The circuit has an excellent stable output and a simple construction as well as has little wasted current and produces a constant voltage proportional to absolute temperature.

7 Claims, 5 Drawing Figures

CONSTANT VOLTAGE GENERATING CIRCUIT

BACKGROUND OF THE INVENTION

1. Field of the Invention

This invention is concerned with a constant voltage generating circuit having operational amplifiers.

2. Description of the Prior Art

The conventional generating circuits have disadvantages such that a simple circuit is not stabilized at its output voltage, upon fluctuation of power voltage, while a circuit showing stable output is complicated in construction as well as wastes a large current. And also, in an exposure control circuit of camera, a constant voltage circuit is needed to produce a constant voltage linearly proportional to absolute temperature, but such a constant voltage circuit has not been developed yet.

SUMMARY OF THE INVENTION

One object of the invention is to provide a constant voltage generating circuit having an excellent stable output and a simple construction.

Another object of the invention is to provide a constant voltage generating circuit having little wasted current and producing a constant voltage proportional to absolute temperature.

DESCRIPTION OF THE PREFERRED EMBODIMENTS

Figure 1:
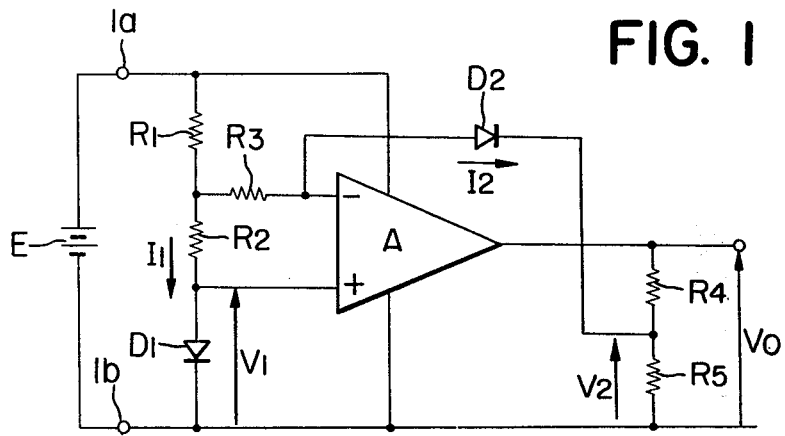
FIG. 1 shows the first embodiment of the invention.

Referring to FIG. 1 of the frist embodiment according to the invention of a generating circuit, resistors R1 and R2, and a diode D1 are connected in series between two input terminals 1a and 1b which each is connected to positive and negative pole of power source E. A connecting point of resistors R1 and R2 is connected to an inverted input terminal (−) of operational amplifier A through a resistor R3, and a connecting point of resistor R2 and diode D1 is connected to a non-inverted terminal (+) of operational amplifier A. Between the output terminal of the amplifier A and the power source E, bleeder resistors R4 and R5 are connected. Between the connecting point of resistors R4 and R5 and the inverted input terminal of operational amplifier A, a feedback diode D2 is connected.

Supposing that amplification factor of operational amplifier A is enormously large, the potentials of the inverted input terminal and the non-inverted terminal are almost equal. Then $$I1R2 = I2R3 \tag{1}$$

wherein

- $I1$: current flowing through resistor R2 and diode D1
- $I2$: current flowing through resistor R3 and feedback diode D2

The potential V1 of non-inverted terminal of amplifier A is equal to the drop in diode D1 due to current $I1$. In general, current/voltage characteristic of a logarithmic conversion element such as diode is represented $$VD = (kT/q)ln(ID/IS) \tag{2}$$

wherein

- $VD$: forward drop in diode
- $k$: Boltzmann's constant
- $T$: absolute temperature
- $q$: electron charge
- $ID$: current through diode
- $IS$: saturated inverse current through diode We get, therefore $$V1 = (kt/q)ln(I1/IS) \tag{3}$$

On the other hand, the potential V2 at the connecting point of bleeder resistors R5 and R4 is equal to the aforementioned voltage V1 minus the drop in diode D2 due to current I2. We get $$V2 = V1 - (kT/q)ln(I2/IS) = (kT/q)ln(I1/I2) \tag{4}$$

Neglecting the drop in R5 due to current I2, the output voltage VO at operational amplifier A is $$VO = [(R4 + R5)/R5]V2 = [(R4 + R5)/R5](kT/q)ln(I1/I2) \tag{5}$$

Substituting $(I1/I2)$ in (5)

$$VO = [(R4+R5)/R5](kT/q)ln(R3/R2) = (kT/q)ln\alpha \tag{6}$$

wherein $$\alpha = \left(\frac{R3}{R2}\right)^{\frac{R4+R5}{R5}}$$

As expressed in (6), the output voltage of the generating circuit is independent of the source voltage E and depends only upon the values of resistors R2, R3, R4 and R5, and it is very stable.

Thus, this generating circuit provides to convert arbitrary voltage to constant voltage. Further, it should be noted that the constant output voltage of this generating circuit is proportional to the absolute temperature.

Resistors R4 and R5 is used to easily set the output voltage at VO, and the invention does not always require them.

Figure 2:
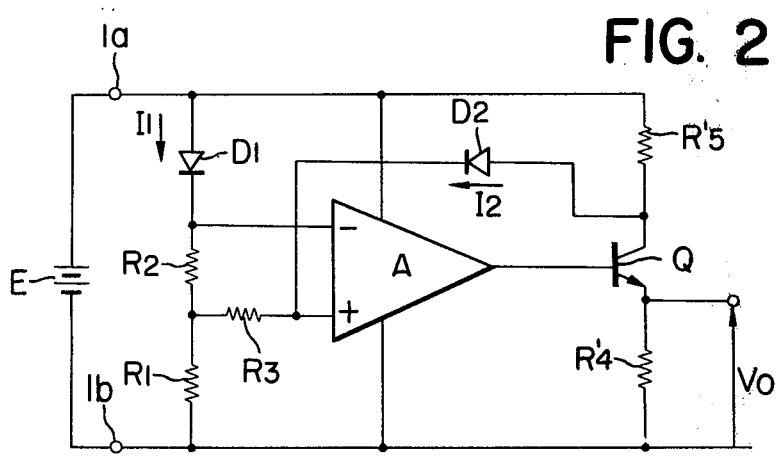
FIG. 2 shows the second embodiment of the invention.

FIG. 2 shows an another embodiment of the invention.

Supposing that current amplification factor $\beta$ of transistor Q is enormously large, output voltage VO is $$VO = (kT/q)ln(R3/R2)^{R5'/R4'}$$

The output voltage VO, therefore, is determined only by the value of resistors R2, R3, R4', and R5' as well as is proportional to absolute temperature.

In the embodiment of FIG. 2, output voltage VO is of the influenced by drop in resistor R5' due to current I2 flowing through feedback diode D2. It depends on variation of current I2 caused from fluctuation of source voltage.

Figure 3:
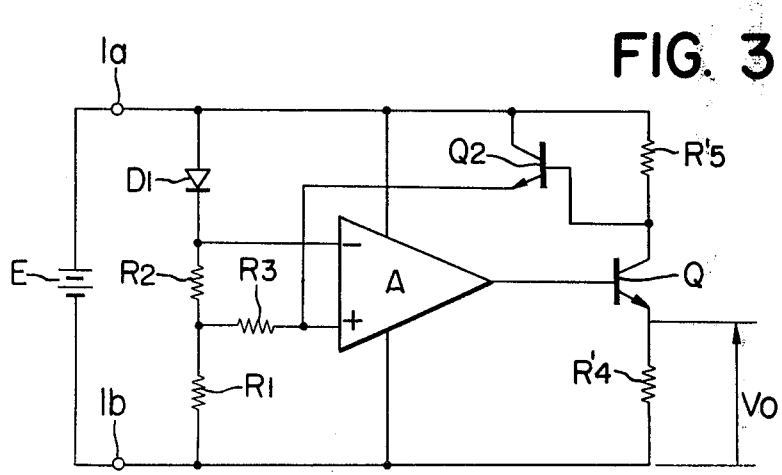
FIG. 3 shows the third embodiment of the invention.

As shown in FIG. 3, the current flowing through resistor R5' becomes I2/β2 (β2 is β of transistor Q2) by using, instead of diode D2, transistor Q2 of which voltage/current characteristic is same as (2). Therefore, if β of transistor Q2 is enormously large, voltage drop in resistor R5' can be reduced and output voltage VO is not influenced by the drop in the resistor R5'.

Emitter current of transistor Q in FIGS. 2 and 3 is independent of source voltage and is constant, and a constant current circuit can be obtained by this circuit, regarding this emitter current as the output current. Transistor Q may be replaced by field-effect transistor.

In the first embodiment, as understood from equation (5) the value of resistor R1 is absolutely independent of output voltage VO and current I1 and I2 can be made small if the value of resistor R1 is possible as large as other factors can allow, and the wasted current required by the circuit can be widely reduced. This is applicable to the case in the second and third embodiment.

Figure 4:
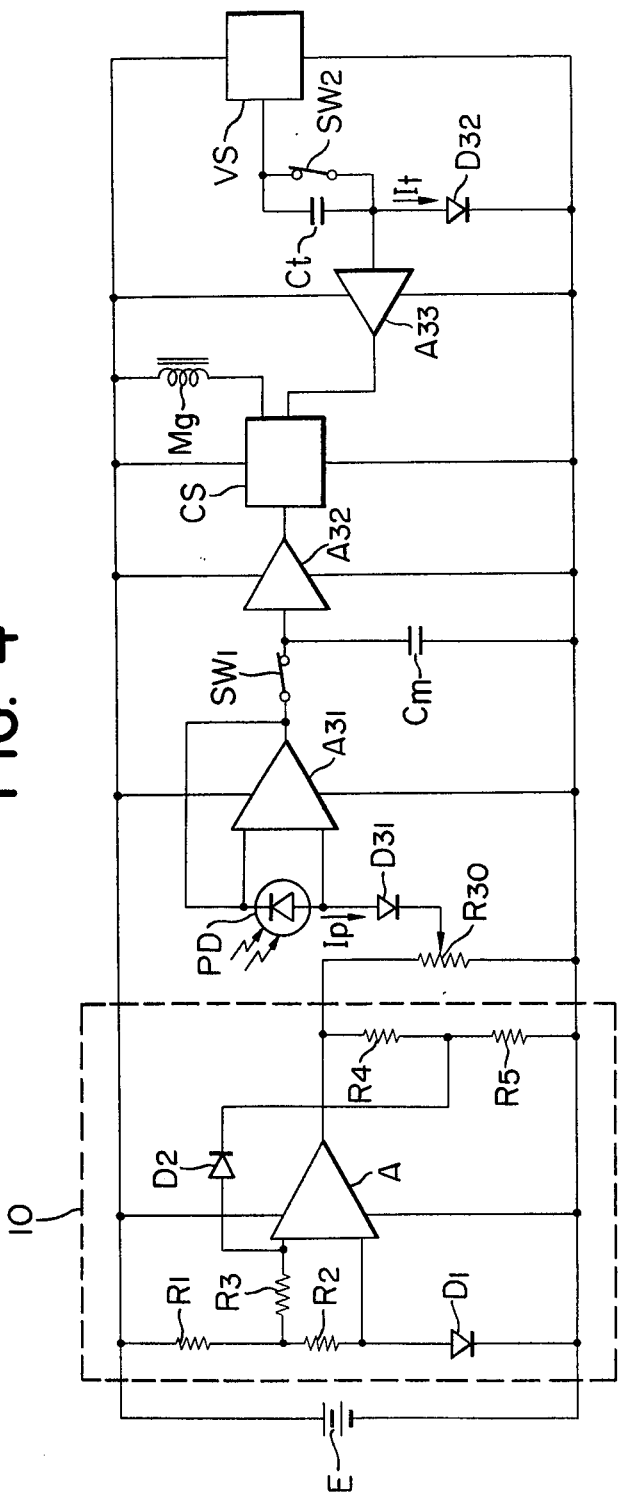
FIG. 4 shows an electric shutter circuit using the voltage generating circuit according to the invention.

An example of an electric shutter of camera using the generating circuit with temperature characteristic according to the invention will be explained, referring to FIG. 4. In the figure, a circuit which logarithmically compresses optical intensity has a composition of photodiode PD, first logarithmic compression diode D31, potentiometer of which resistance is varied by setting of exposure factor R30, and operational amplifier A31. A circuit memorizing optical intensity is composed of a memory capacitor and switch SW1 which operates at instance just before interrupting light coming into the photodiode PD connected to the output terminal of operational amplifier A31. A logarithmic compression circuit for logarithmically compressing exposure period has a composition of delay capacitor Ct, secondary logarithmic compression diode D32, switch SW2 opened in response to opening of a shutter in camera, and constant voltage circuit VS. An operation circuit comprising circuit impedance converters A32, A33 and comparator switch circuit CS permits to energize or deenergize electromagnet Mg and to close the shutter when the output of optical intensity logarithmic compression circuit meets a given relation to that, of exposure period logarithmic compression circuit. Thus, the operation of an electric shutter circuit is completed. A dotted line indicates voltages generating circuit 10 according to the invention.

In the electric shutter circuit, the magnitude of photocurrent Ip flowing through both first diode D31 and photodiode PD is very small compared with that of current It flowing through a second diode D32 from delay condenser Ct (actual value of Ip is about $10^{-10}$A, and It about $10^{-5}$A). The forward drop VD1 and VD2 in diodes D31 and D32, therefore, are not equal, which is a problem to process signals in operation circuit A32, A33, and Cs.

The coefficient of a diode depends upon magnitude of current flowing through the diode. Now, we will prove it.

The equation (2) represents current/voltage characteristic of a diode as described above. The constants in the equation (2) depending upon temperature are absolute temperature T in addition to inverse saturated current Is, which has the relation with absolute temperature as expressed below $$IS = B\, e^{-C/T} \tag{7}$$

wherein

B: constant depending upon geometrical dimensions of diode

C: constant depending upon physical property of diode

Substituting the equation (7) to the equation (2)

$$VD = (kT/q)ln(ID/B) + kC/q \tag{8}$$

Differentiating the equation (8) on absolute temperature, we get temperature characteristics $$dVD/dT = (k/q)ln(ID/B) \tag{9}$$

Obtaining $B = 9.44 \times 10^{-5}$ by the experiment, we get at $Ip = 10^{-10}$ A $$dVD1/dT = -3.17\ mV/°C$$

and at $It = 10^{-5}$ A $$dVD2/dT = -2.18\ mV/°C$$

The temperature characteristics of the first diode D31 flowing optical current from photodiode PD and that of second diode flowing current from delay capacitor Ct are not same on account of different magnitude of the flowing current.

If forward voltage drops and temperature characteristics of both diode D31 and D32 are same, the operation circuit can easily process signals and can easily cancel temperature character.

Output voltage $VO = (kT/q)ln\ \alpha$ of voltage generating circuit 10 having temperature characteristic according to the invention is divided by potentiometer R30 for setting an exposure factor positioned by preset value of film sensitivity, iris of a lens, etc. and the diode D31 is biased by the divided voltage. The voltage divided by the exposure factor presetting potentiometer R30 being $nVO(0 < n \leq 1)$, we get voltage Vcm applied to memory capacitor Cm $$Vcm = VD1 + nVO = (kT/q)ln(IP/IS) + nkT/q\, ln\alpha = (kT/q)ln(\alpha^n \cdot IP/IS) \tag{10}$$

wherein

VD1: voltage across diode D31

Voltage Vcm, therefore, is exactly equal to the voltage drop over first diode D31 with $\alpha^n$ times current of optical current IP, and if voltage $nVO = (kT/q)ln(It/Ip)$ is applied to the first diode D31 from voltage generating circuit 10 according to the invention, $\alpha^n$ being $IT/Ip$, voltage drop over first diode D31 is equal to that over the second diode D32 and processing signals in operation circuit becomes easy.

Moreover, temperature property of voltage Vcm is $$dVcm/dT = dVD1/dT + dVO/dT = (k/q)ln(Ip/B) + (k/q)ln(It/Ip) = (k/q)ln(It/B) \tag{11}$$

which is equal to that of forward voltage drop over the second diode D32, and differential operation of the two inputs in the operation circuit can compensate the temperature property to null.

Figure 5:
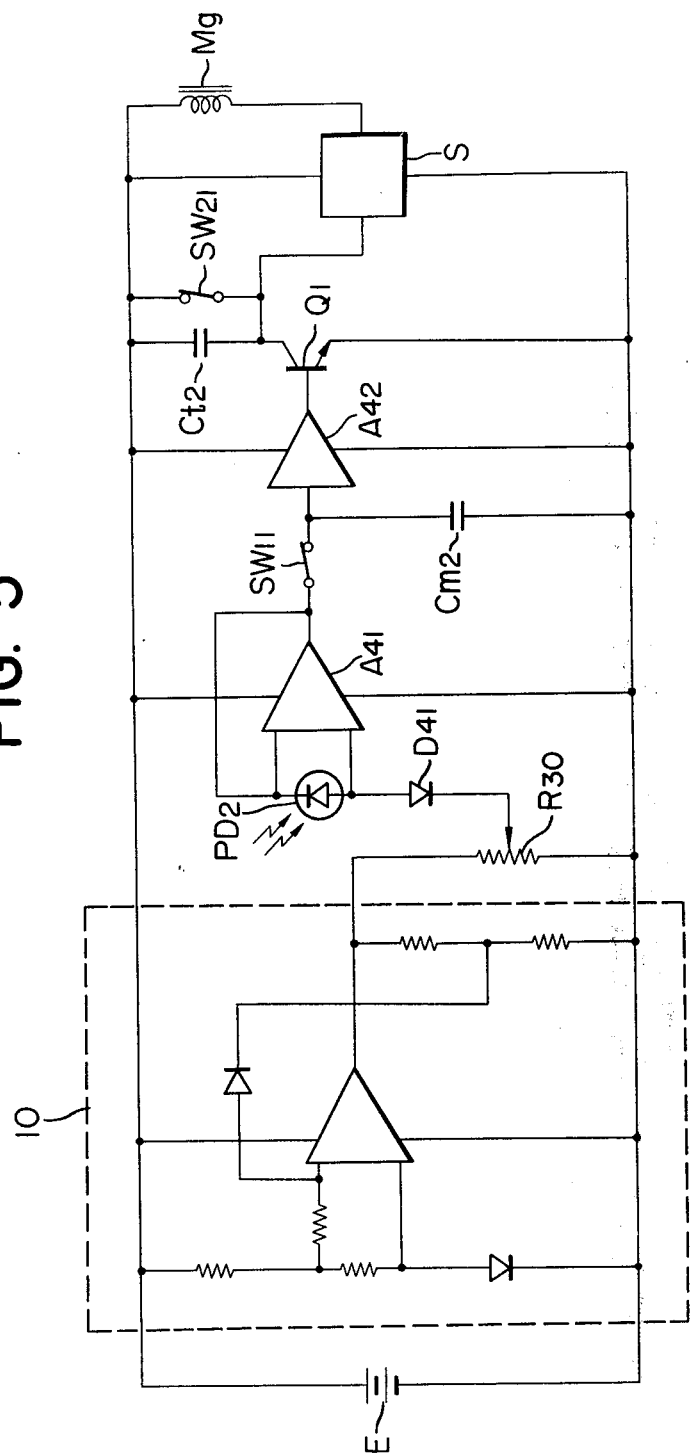
FIG. 5 shows an another electric shutter circuit using the voltage generating circuit according to the invention.

FIG. 5 shows an another application of the voltage generating circuit to an electric shutter circuit of the other camera. Photodiode PD2, first logarithmic compression diode D41, potentiometer R30 for setting exposure factor, and operational amplifier A41 together constitute the same optical intensity logarithmic compression circuit as described above. Memory circuit is composed of a switch SW11 and a memory condenser Cm2. Logarithmic extension circuit of memory voltage in aforementioned memory condenser Cm2 is composed of an impedance conversion circuit A42, a delay condenser Ct2, a transistor Q1 and a trigger switch SW21 sequentially operated with shutter opening. Switch circuit S energize a electromagnet Mg to run a second blind and the exposure is completed with the voltage at the aforementioned logarithmic extension circuit reaches at a predetermined value. Thus, the electric shutter circuit can be realized. There exists still same problem in the electric shutter circuit as described above. The solution is, as described above, that the voltage depending upon temperature in the voltage generating circuit according to the invention is applied to diode D41 through a potentiometer for setting exposure factor.

And also, as described above, a wiper of potentiometer R30 for setting exposure factor is positioned according to film sensitivity, iris lens, etc. by which n in the equation (10) varies, and information on various exposure factors can be introduced into automatic shutter speed control circuits.

The voltage generating circuit according to the invention can be used as temperature compensation circuit of temperature-dependent elements such as semiconductors and diodes.

What is claimed is

1. In a constant voltage generating circuit which converts power source voltage to a constant voltage, the improvement comprising:
    a. a pair of first and second input terminals, to which power source voltage is applied;
    b. an operational amplifier (OP hereafter) having an output terminal supplying the constant output of the constant voltage generating circuit and two input terminals;
    c. a first resistor element connected between the first input terminal and one input terminal of OP;
    d. a second resistor element connected between the first input terminal and the other input terminal of OP; and
    e. a pair of first and second logarithmic conversion elements generating voltage which is logarithmically proportional to current flowing in itself, the first logarithmic conversion element being connected between the first input terminal of OP and output terminal of OP and the second logarithmic conversion element being connected between the other input terminal and second input terminal of constant voltage generating circuit.

2. A circuit according to claim 1, wherein each of the voltages of the first and second logarithmic conversion elements is proportional to absolute temperature to enable the constant voltage to be proportional to absolute temperature.

3. A circuit according to claim 2, wherein the first and second logarithmic conversion element are diodes.

4. A circuit according to claim 2, wherein the first logarithmic conversion element is transistor and the second conversion element is diode.

5. A circuit according to claim 1, further comprising a third resistor connected between the first logarithmic conversion element and the output terminal of OP and a fourth resistor connected between either the first or second input terminals, and the connecting point of the first logarithmic conversion element and the third resistor.

6. A circuit according to claim 1, further comprising a transistor having a control electrode connected to the output terminal of said operational amplifier and two main current carrying electrodes of which one is connected to said first logarithmic conversion element and of which the other feeds constant current, and a resistor connected between said one electrode and one of said first and second input terminals.

7. A circuit according to claim 6, further comprising a further resistor connected between the other electrode and the other of said first and second input terminals for producing constant voltage across said further resistor.

* * * * *